US011987081B2

(12) United States Patent
Singh et al.

(10) Patent No.: US 11,987,081 B2
(45) Date of Patent: May 21, 2024

(54) TIRE PRESSURE MONITORING SYSTEM

(71) Applicant: The Goodyear Tire & Rubber Company, Akron, OH (US)

(72) Inventors: Kanwar Bharat Singh, Lorenztweiler (LU); Lautaro Dolberg, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 452 days.

(21) Appl. No.: 17/384,928

(22) Filed: Jul. 26, 2021

(65) Prior Publication Data

US 2022/0063357 A1 Mar. 3, 2022

Related U.S. Application Data

(60) Provisional application No. 63/070,862, filed on Aug. 27, 2020.

(51) Int. Cl.
*B60C 23/04* (2006.01)
(52) U.S. Cl.
CPC ...... *B60C 23/0484* (2013.01); *B60C 23/0457* (2013.01); *B60C 23/0474* (2013.01); *B60C 23/0479* (2013.01)
(58) Field of Classification Search
USPC .......................................................... 702/35
See application file for complete search history.

(56) References Cited

U.S. PATENT DOCUMENTS

| 6,404,330 | B1 | 6/2002 | Sugisawa |
| 6,581,449 | B1 | 6/2003 | Brown et al. |
| 6,705,157 | B2 | 3/2004 | Fischer et al. |
| 6,748,799 | B2 | 6/2004 | Fischer et al. |

(Continued)

FOREIGN PATENT DOCUMENTS

| EP | 2142390 B1 | 1/2015 |
| EP | 2676818 B1 | 1/2015 |

(Continued)

OTHER PUBLICATIONS

Search Report for corresponding European application received by Applicant on Jul. 4, 2022.

(Continued)

*Primary Examiner* — Paul D Lee
(74) *Attorney, Agent, or Firm* — Edward T. Kennedy

(57) ABSTRACT

A tire pressure monitoring system monitors the pressure in at least one tire supporting a vehicle. The system includes at least one sensor mounted on the tire for measuring a pressure and a temperature of the tire. Transmission means transmit the measured pressure data and temperature data to a processor, and a tire pressure model is executed on the processor. The tire pressure model includes a driving event extractor to extract cold pressure data from the measured pressure data, and a temperature compensator to generate a compensated cold tire pressure from the cold pressure data. A noise filter filters sensor noise and generates a filtered cold tire pressure from the compensated cold tire pressure. A detection module receives the filtered cold tire pressure and determines an air pressure leak rate of the tire, and a leak notification corresponding to the air pressure leak rate is generated.

19 Claims, 13 Drawing Sheets

(56) References Cited

U.S. PATENT DOCUMENTS

| | | |
|---|---|---|
| 6,838,983 B1 | 1/2005 | Wong |
| 6,868,358 B2 | 3/2005 | Brown, Jr. |
| 6,907,776 B2 | 6/2005 | Fischer et al. |
| 6,966,220 B2 | 11/2005 | Yueh |
| 7,004,019 B2 | 2/2006 | Fischer et al. |
| 7,181,366 B2 | 2/2007 | Rimkus et al. |
| 7,209,855 B2 | 4/2007 | Fabre et al. |
| 7,242,285 B2 | 7/2007 | Shaw |
| 7,301,444 B2 | 11/2007 | Matsuura |
| 7,321,840 B2 | 1/2008 | Abramovitch |
| 7,323,975 B2 | 1/2008 | Hall et al. |
| 7,388,478 B2 | 6/2008 | Watabe |
| 7,432,801 B2 | 10/2008 | Verrier et al. |
| 7,434,455 B2 | 10/2008 | Alff |
| 7,437,922 B2 | 10/2008 | Bougeard et al. |
| 7,513,145 B2 | 4/2009 | Katou et al. |
| 7,515,039 B2 | 4/2009 | Casey et al. |
| 7,518,495 B2 | 4/2009 | Tang et al. |
| 7,528,705 B2 | 5/2009 | Brown, Jr. et al. |
| 7,594,433 B2 | 9/2009 | Bondu |
| 8,279,054 B2 | 10/2012 | Kuchler et al. |
| 8,373,552 B2 | 2/2013 | Liberge |
| 8,489,274 B2 | 7/2013 | Boehme et al. |
| 8,514,062 B2 | 8/2013 | Patel et al. |
| 8,565,959 B2 | 10/2013 | Brown, Jr. |
| 8,833,151 B2 | 9/2014 | Tebano et al. |
| 9,057,661 B2 | 6/2015 | Keller |
| 9,079,461 B2 | 7/2015 | Suh et al. |
| 9,091,537 B2 | 7/2015 | Farr et al. |
| 9,120,357 B2 | 9/2015 | Deniau et al. |
| 9,145,033 B2 | 9/2015 | Hall et al. |
| 9,162,541 B2 | 10/2015 | Reynes |
| 9,248,707 B2 | 2/2016 | Zhou et al. |
| 9,261,432 B2 | 2/2016 | Dudar |
| 9,296,267 B2 | 3/2016 | Mcintyre et al. |
| 9,387,732 B1 | 7/2016 | Gunawan |
| 9,418,492 B2 | 8/2016 | Sinner et al. |
| 9,446,634 B2 | 9/2016 | Wagner et al. |
| 9,446,635 B2 | 9/2016 | Wagner et al. |
| 9,487,054 B2 | 11/2016 | Mcintyre et al. |
| 9,505,502 B2 | 11/2016 | Miller |
| 9,561,695 B2 | 2/2017 | Horikoshi et al. |
| 9,636,956 B2 | 5/2017 | Xu |
| 9,694,630 B2 | 7/2017 | Kona |
| 9,802,447 B2 | 10/2017 | Petrucelli |
| 9,895,943 B2 | 2/2018 | Bill |
| 9,925,837 B2 | 3/2018 | Peine et al. |
| 10,035,387 B2 | 7/2018 | Carresjö et al. |
| 10,150,339 B2 | 12/2018 | Zaroor et al. |
| 10,166,823 B2 | 1/2019 | Sugiyama |
| 10,183,534 B2 | 1/2019 | Bill |
| 10,189,319 B2 | 1/2019 | Fu |
| 10,232,673 B1 | 3/2019 | Lavoie et al. |
| 10,252,584 B2 | 4/2019 | Juzswik |
| 10,286,738 B2 | 5/2019 | Taki |
| 10,350,949 B2 | 7/2019 | Surendra |
| 10,442,256 B2 | 10/2019 | Baum et al. |
| 10,442,257 B2 | 10/2019 | Abdossalami et al. |
| 10,543,721 B2 | 1/2020 | Choi |
| 10,696,108 B1 | 6/2020 | Alghooneh et al. |
| 2001/0004236 A1* | 6/2001 | Letkomiller ............ B60C 23/20 340/595 |
| 2004/0017289 A1* | 1/2004 | Brown, Jr. .......... B60C 23/0408 340/442 |
| 2005/0280522 A1* | 12/2005 | Verrier ................ B60C 23/0408 73/146 |
| 2008/0042817 A1* | 2/2008 | Fogelstrom .......... B60C 23/009 340/442 |
| 2008/0266073 A1* | 10/2008 | Tu ......................... B60S 5/043 73/146.2 |
| 2012/0029759 A1 | 2/2012 | Suh et al. |
| 2013/0046437 A1 | 2/2013 | Eloy |
| 2013/0274988 A1* | 10/2013 | Reynes ............... B60C 23/0408 701/29.4 |
| 2014/0039752 A1 | 2/2014 | Juzswik |
| 2014/0277910 A1* | 9/2014 | Suh ..................... B60C 23/0476 701/33.9 |
| 2015/0012170 A1 | 1/2015 | Pita-Gil et al. |
| 2017/0200326 A1 | 7/2017 | Liu et al. |
| 2018/0207999 A1 | 7/2018 | Dunning et al. |
| 2019/0375254 A1 | 12/2019 | Steiner et al. |
| 2020/0070596 A1 | 3/2020 | Muhlhoff et al. |
| 2020/0277086 A1 | 9/2020 | Arnoux |

FOREIGN PATENT DOCUMENTS

| | | |
|---|---|---|
| EP | 3560736 A1 | 10/2019 |
| WO | 2009036547 A1 | 3/2009 |
| WO | 2015106907 A1 | 7/2015 |
| WO | 2019092352 A1 | 5/2019 |

OTHER PUBLICATIONS

Office action for Chinese patent application 202110995492.2 dated Feb. 2, 2022.

\* cited by examiner

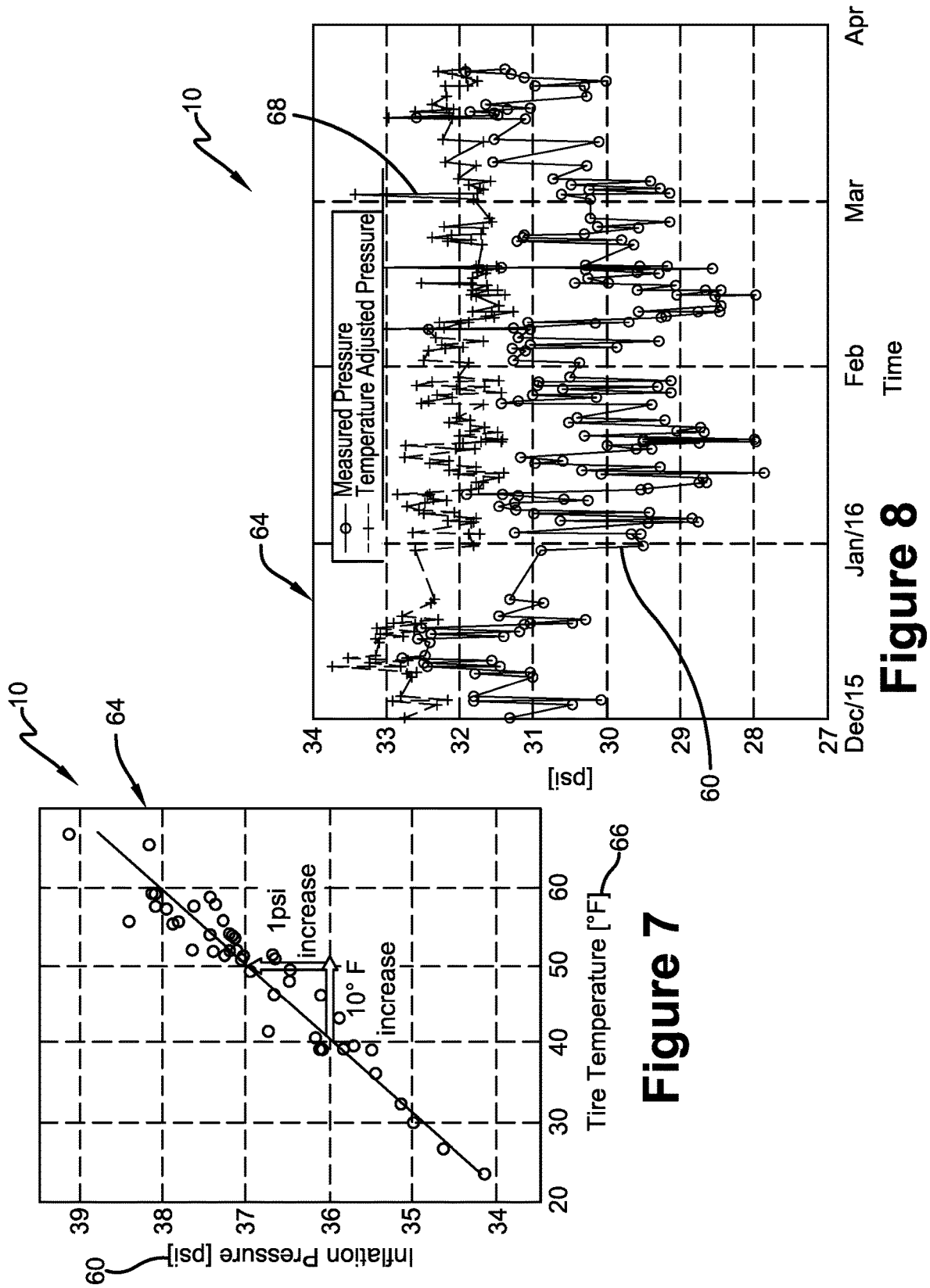

TIRE PRESSURE MONITORING SYSTEM

FIELD OF THE INVENTION

The invention relates generally to tire monitoring systems. More particularly, the invention relates to systems that monitor conditions in a tire, such as tire pressure. Specifically, the invention is directed to a system that obtains tire pressure data, determines if a rapid air pressure leak or a slow air pressure leak is present, and generates a corresponding notification.

BACKGROUND OF THE INVENTION

Vehicle tires, and particularly pneumatic tires, typically have certain conditions or parameters that are beneficial to monitor during vehicle operation. For example, monitoring the pressure of a pneumatic tire may be helpful in assessing the condition and/or performance of the tire, as a low pressure may indicate that there is an issue with the tire.

To monitor tire pressure, techniques have been developed to measure the pressure inside the tire cavity using sensors that are attached to the tire. Such techniques obtain pressure data in real time from the sensors.

The measured tire pressure may be correlated to a specific tire and transmitted to an electronic control system of the vehicle. The measured tire pressure data may then be employed to improve the function of vehicle systems, such as an anti-lock brake system (ABS), electronic stability control system (ECS), and the like. The measured tire pressure data may also be sent to an operator of the vehicle.

In addition, for fleets of commercial vehicles or passenger vehicles, it is desirable for a manager of the fleet to be informed of tire pressure to make informed decisions about the tires and the vehicle. For example, in the event that a pressure measurement is below a threshold value, an alert may be sent to the fleet manager. The fleet manager may then instruct the vehicle operator to reduce the vehicle speed or direct the vehicle to a service center.

However, prior art techniques typically only compare the measured pressure to the threshold value and transmit an alert when the measured pressure drops below the threshold value. Such techniques lack precision, as they may generate an alert that is not needed. In addition, prior art techniques do not distinguish between a rapid leak condition and a slow leak condition. Detection of a slow leak detection is particularly advantageous for fleet managers, as preventive measures for the tire may be taken according to a fleet maintenance schedule, rather than unnecessarily removing the vehicle from immediate service.

As a result, there is a need in the art for a system that obtains tire pressure data, determines with precision if a rapid air pressure leak or a slow air pressure leak is present, and generates a corresponding notification.

SUMMARY OF THE INVENTION

According to an aspect of an exemplary embodiment of the invention, a tire pressuring monitoring system for monitoring the pressure in at least one tire supporting a vehicle is provided. The system includes at least one sensor mounted on the tire for measuring a pressure and a temperature of the tire. Transmission means transmit the measured pressure data and temperature data to a processor, and a tire pressure model is executed on the processor. The tire pressure model includes a driving event extractor to extract cold pressure data from the measured pressure data, and a temperature compensator to generate a compensated cold tire pressure from the cold pressure data. A noise filter filters sensor noise and generates a filtered cold tire pressure from the compensated cold tire pressure. A detection module receives the filtered cold tire pressure and determines an air pressure leak rate of the tire. A leak notification corresponding to the air pressure leak rate is generated by the tire pressure model.

BRIEF DESCRIPTION OF THE DRAWINGS

The invention will be described by way of example and with reference to the accompanying drawings, in which:

FIG. 7 is a graphical representation of another aspect of the tire pressure monitoring system shown in FIG. 4;

FIG. 8 is another graphical representation of the aspect of the tire pressure monitoring system shown in FIG. 7;

Similar numerals refer to similar parts throughout the drawings.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance when some presumed conditions are met.

"Lateral" means an axial direction.

"Luenberger observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
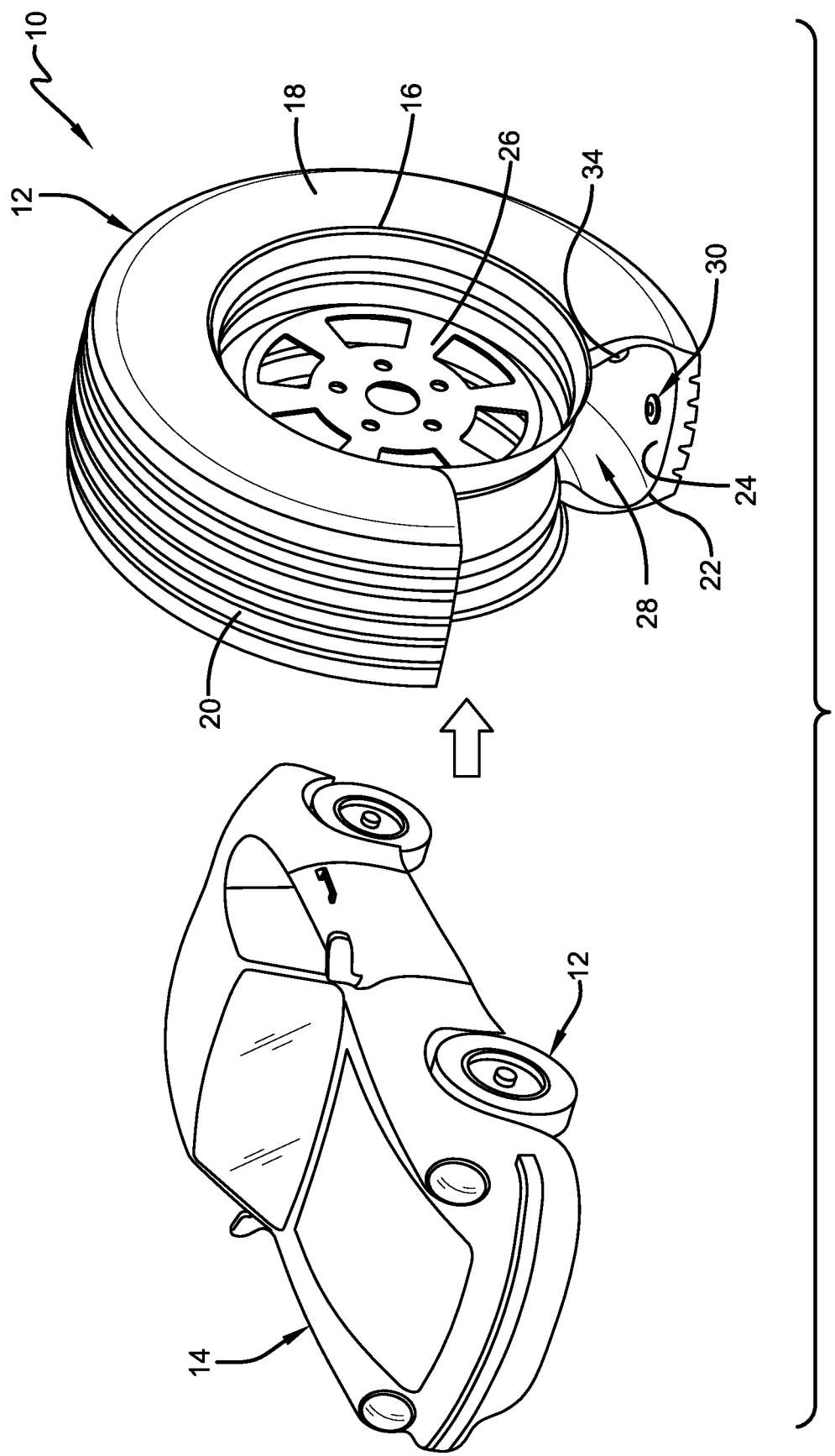
FIG. 1 is a schematic perspective view of a vehicle and tire that employ an exemplary embodiment of the tire pressure monitoring system of the present invention, showing the tire partially in section.

Turning now to FIGS. 1 through 14, an exemplary embodiment of the tire pressure monitoring system of the present invention is indicated at 10. With particular reference to FIG. 1, the system 10 monitors the pressure in each tire 12 supporting a vehicle 14. While the vehicle 14 is depicted as a passenger car, the invention is not to be so restricted. The principles of the invention find application in other vehicle categories such as commercial trucks, off-the-road vehicles, and the like, in which vehicles may be supported by more or fewer tires. In addition, the invention finds application in a single vehicle 14 or in fleets of vehicles.

Each tire 12 includes a pair of bead areas 16 (only one shown) and a bead core (not shown) embedded in each bead area. Each one of a pair of sidewalls 18 (only one shown) extends radially outward from a respective bead area 16 to a ground-contacting tread 20. The tire 12 is reinforced by a carcass 22 that toroidally extends from one bead area 16 to the other bead area, as known to those skilled in the art. An innerliner 24 is formed on the inside surface of the carcass 22. The tire 12 is mounted on a wheel 26 in a manner known to those skilled in the art and, when mounted, forms an internal cavity 28 that is filled with a pressurized fluid, such as air.

A sensor unit 30 may be attached to the innerliner 24 of each tire 12 by means such as an adhesive and measures certain parameters of the tire, as will be described in greater detail below. It is to be understood that the sensor unit 30 may be attached in such a manner, or to other components of the tire 12, such as between layers of the carcass 22, on or in one of the sidewalls 18, on or in the tread 20, and/or a combination thereof. For the purpose of convenience, reference herein shall be made to mounting of the sensor unit 30 on the tire 12, with the understanding that mounting includes all such attachment.

The sensor unit 30 is mounted on each tire 12 for the purpose of detecting certain real-time tire parameters inside the tire, such as tire pressure and temperature. Preferably the sensor unit 30 is a tire pressure monitoring system (TPMS) module or sensor, of a type that is commercially available, and may be of any known configuration. For the purpose of convenience, the sensor unit 30 shall be referred to as a TPMS sensor. Each TPMS sensor 30 preferably also includes electronic memory capacity for storing identification (ID) information for each tire 12, known as tire ID information. Alternatively, tire ID information may be included in another sensor unit, or in a separate tire ID storage medium, such as a tire ID tag 34.

The tire ID information may include manufacturing information for the tire 12, such as: the tire type; tire model; size information, such as rim size, width, and outer diameter; manufacturing location; manufacturing date; a treadcap code that includes or correlates to a compound identification; and a mold code that includes or correlates to a tread structure identification. The tire ID information may also include a service history or other information to identify specific features and parameters of each tire 12, as well as mechanical characteristics of the tire, such as cornering parameters, spring rate, load-inflation relationship, and the like. Such tire identification enables correlation of the measured tire parameters and the specific tire 12 to provide local or central tracking of the tire, its current condition, and/or its condition over time. In addition, global positioning system (GPS) capability may be included in the TPMS sensor 30 and/or the tire ID tag 34 to provide location tracking of the tire 12 during transport and/or location tracking of the vehicle 14 on which the tire is installed.

Figure 2:
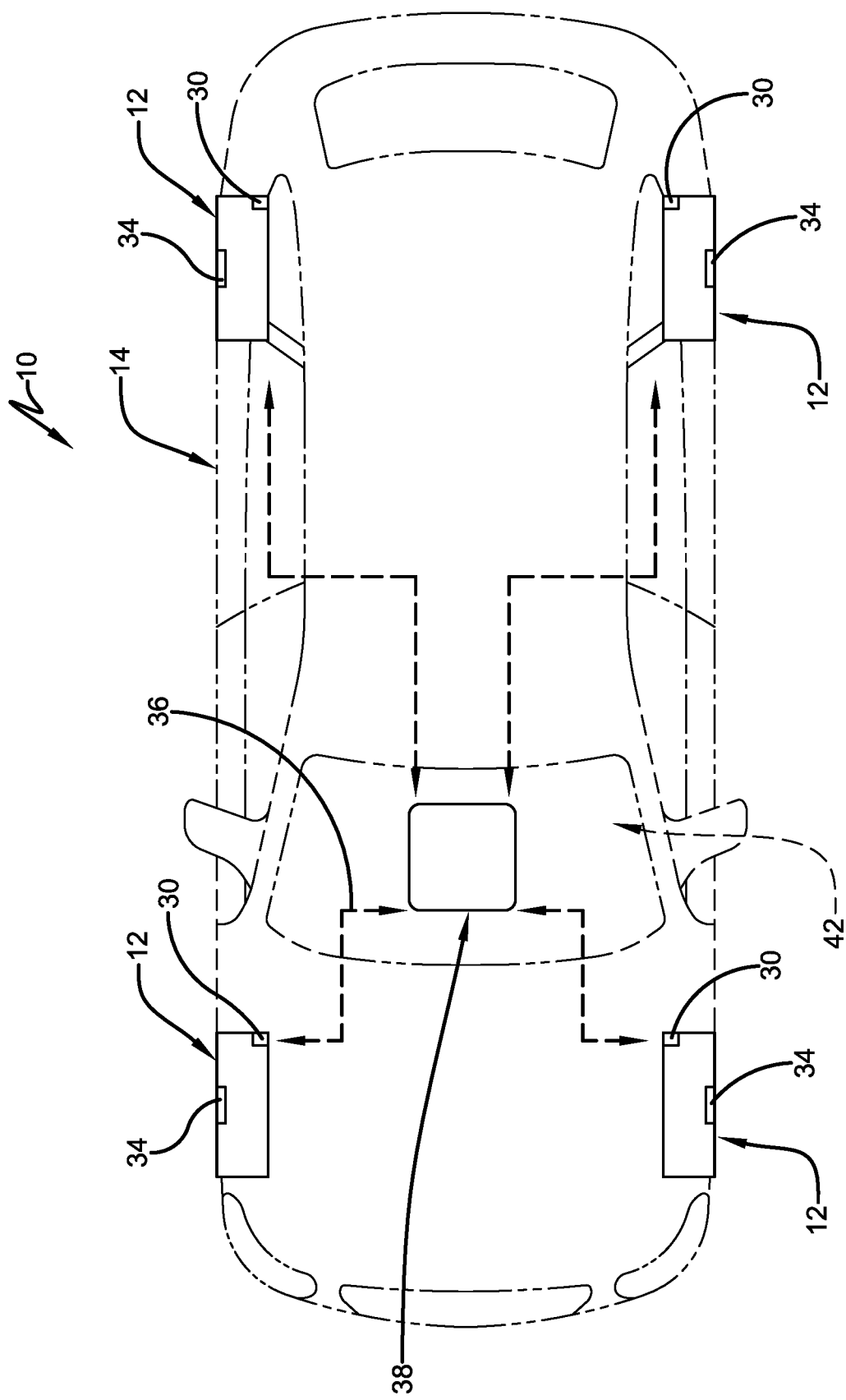
FIG. 2 is a schematic plan view of the vehicle shown in FIG. 1.

Turning now to FIG. 2, the TMPS sensor 30 and the tire ID tag 34 each include an antenna for wireless transmission 36 of the measured tire pressure and temperature, as well as tire ID data, to a processor 38. The processor 38 may be mounted on the vehicle 14 as shown, or may be integrated into the TPMS sensor 30. For the purpose of convenience, the processor 38 will be described as being mounted on the vehicle 14, with the understanding that the processor may alternatively be integrated into the TPMS sensor 30. Preferably, the processor 38 is in electronic communication with or integrated into an electronic system of the vehicle 14, such as the vehicle CAN bus system 42, which is referred to as the CAN bus.

Aspects of the tire data information system 10 preferably are executed on the processor 38 or another processor that is accessible through the vehicle CAN bus 42, which enables input of data from the TMPS sensor 30 and the tire ID tag 34, as well as input of data from other sensors that are in electronic communication with the CAN bus. In this manner, the tire pressure monitoring system 10 enables direct measurement of tire pressure and temperature with the TPMS sensor 30, which preferably is transmitted to the processor 38. Tire ID information preferably is transmitted from the TPMS sensor 30 or the tire ID tag 34 to the processor 38. The processor 38 preferably correlates the measured tire pressure, the measured tire temperature, the measurement time, and ID information for each tire 12.

Figure 3:
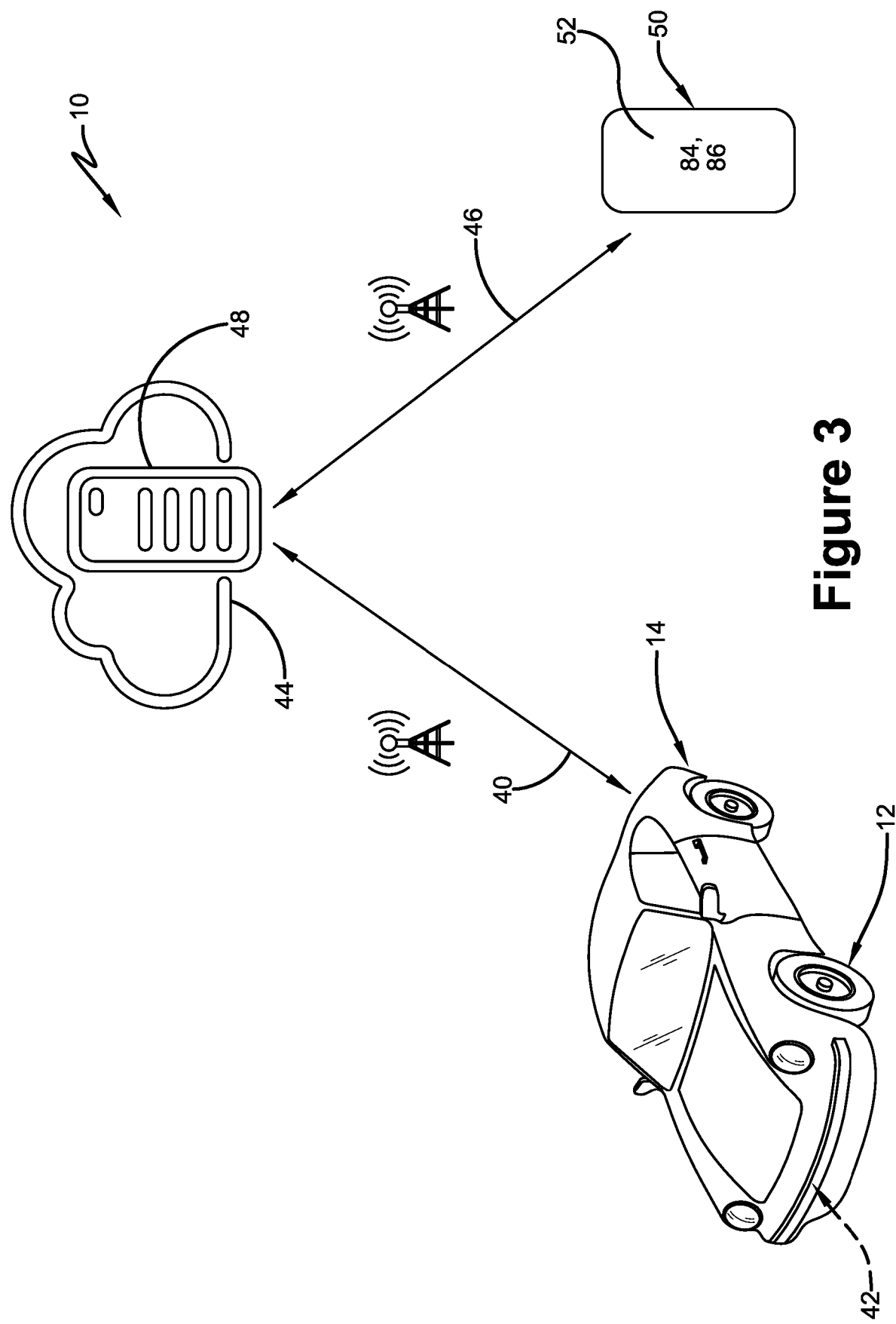
FIG. 3 is a schematic perspective view of the vehicle shown in FIG. 1 with a representation of data transmission to a cloud-based server and to a fleet management device.

Referring to FIG. 3, when the measured tire pressure, measured tire temperature, measurement time and ID information are correlated for each tire 12, the data may be wirelessly transmitted 40 from the processor 38 (FIG. 2) and/or the CAN-bus 42 on the vehicle 14 to a remote processor 48, such as a processor in a cloud-based server 44. The cloud-based server 44 preferably executes a model 54 of the tire pressure monitoring system 10, which will be described in greater detail below. Output from the system 10 may be wirelessly transmitted 46 to a fleet management server 50 that includes a display 52 for showing output and/or notifications from the tire pressure monitoring system, as will be described in greater detail below.

Figure 4:
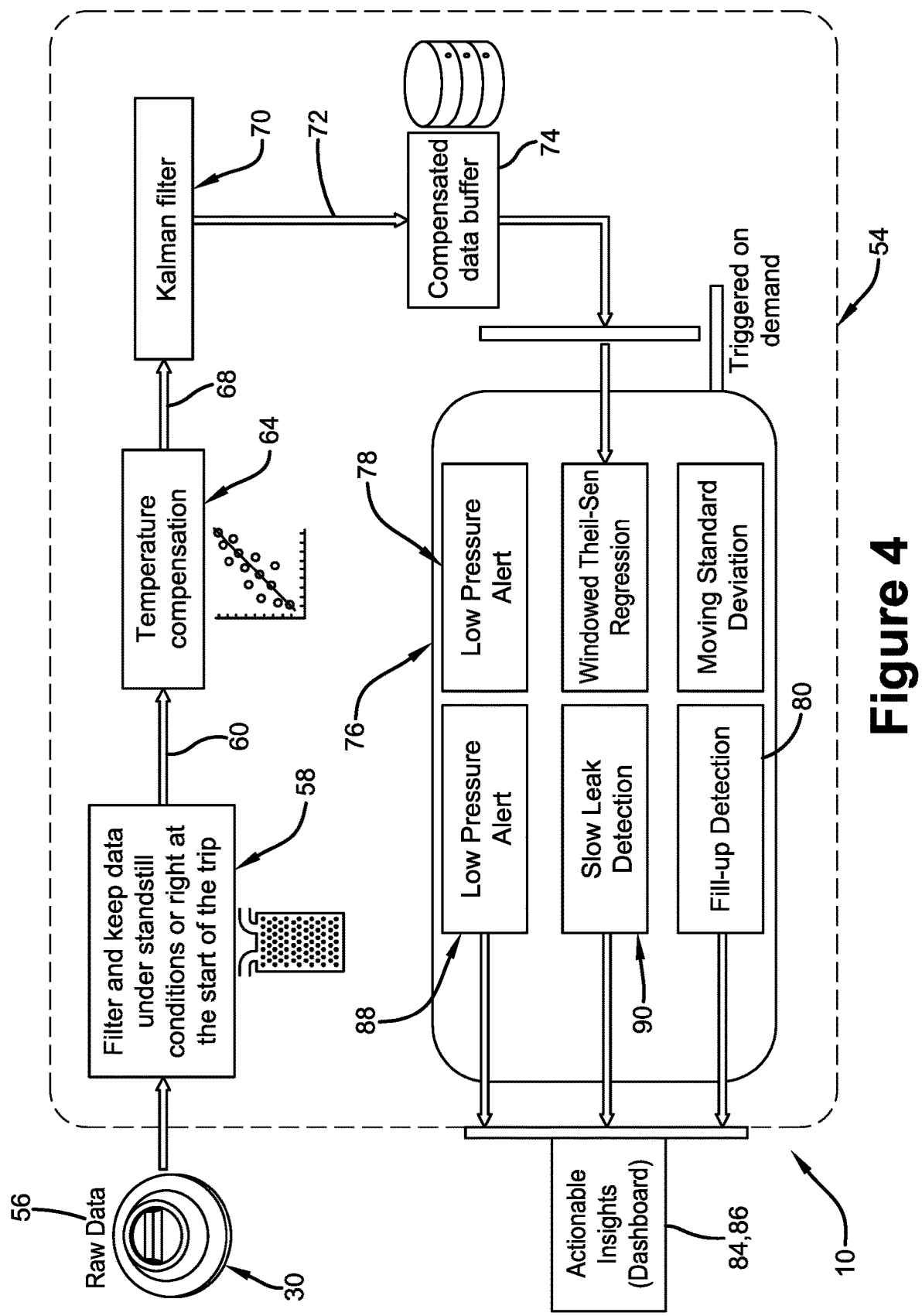
FIG. 4 is a flow diagram showing aspects of an exemplary embodiment of the tire pressure monitoring system of the present invention.
Figure 5:
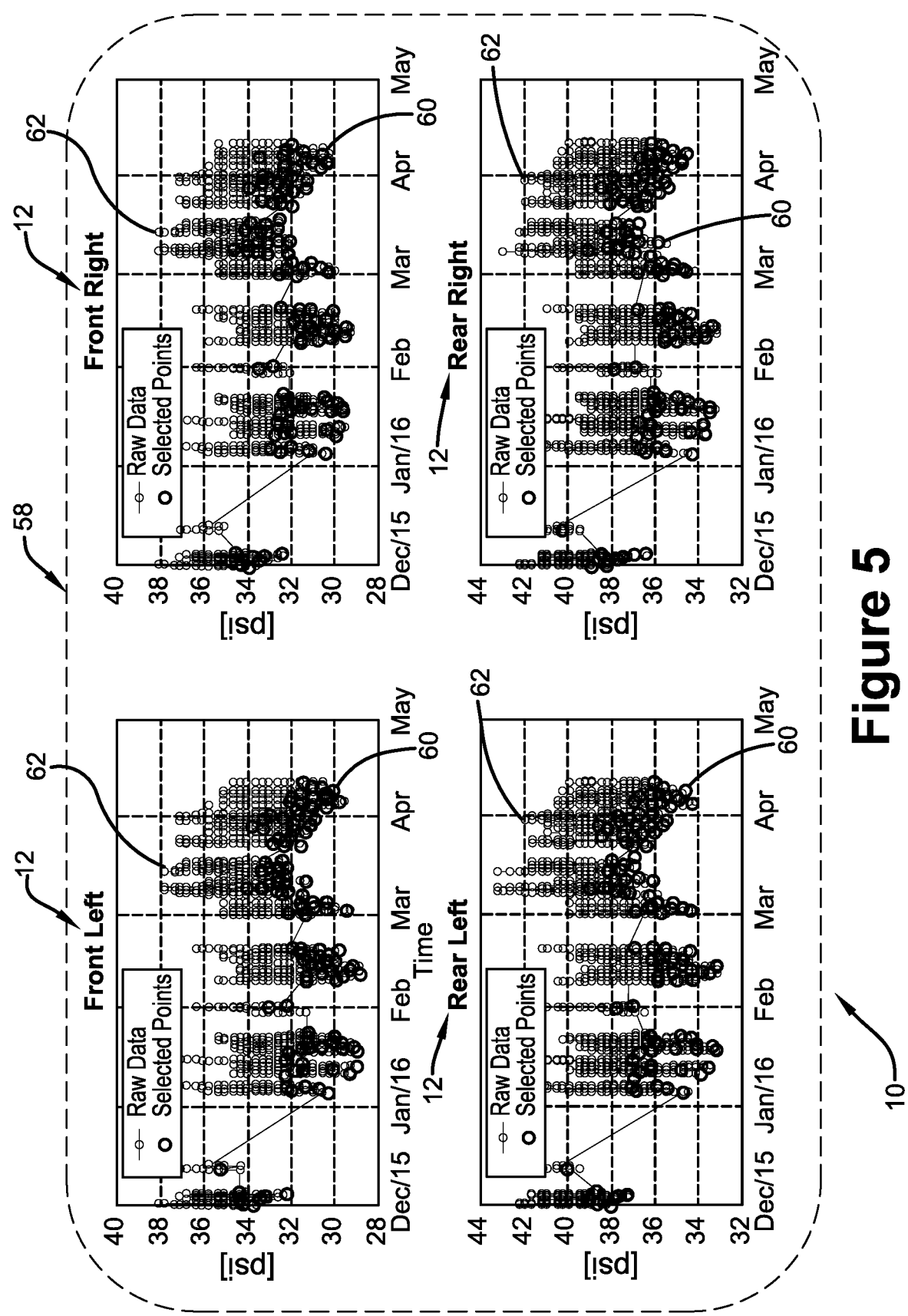
FIG. 5 is a graphical representation of an aspect of the tire pressure monitoring system shown in FIG. 4.

Turning to FIG. 4, the tire pressure monitoring system 10 includes a tire pressure model 54, which receives tire data 56. The tire data 56 includes the above-described measured tire pressure, measured tire temperature, measurement time and ID information for each tire 12.

Figure 6:
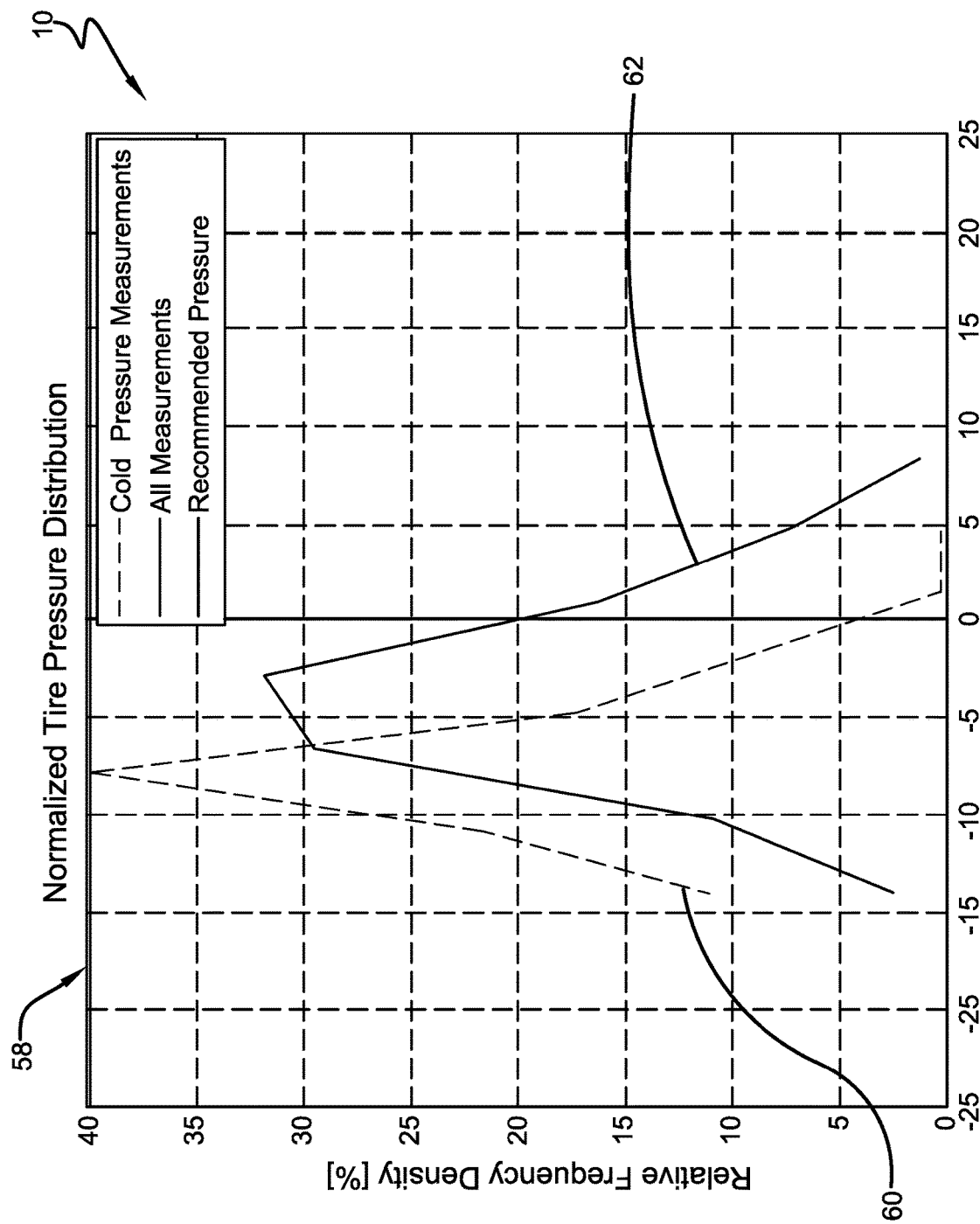
FIG. 6 is another graphical representation of the aspect of the tire pressure monitoring system shown in FIG. 5.

The tire pressure model 54 filters or extracts heat effects from the tire data 56 with a driving event extractor 58. With additional reference to FIG. 5, the driving event extractor 58 extracts cold pressure data 60 from the raw pressure data 62. More particularly, due to heating effects of air in the tire cavity 28 (FIG. 1) during operation of the vehicle 14, the cold tire pressures 60 are shifted lower than the distribution of all of the raw pressure data 62. As shown in FIG. 6, the driving event extractor 58 thus removes heating effects of the raw pressure data 62 due to operation of the vehicle 14 to arrive at the cold pressure values 60. Any suitable data filtering technique may be employed by the driving event extractor 58 to extract the cold pressure data 60.

Returning to FIG. 4, the tire pressure model 54 filters ambient temperature effects from the cold pressure data 60 with a temperature compensator 64. Ambient temperature affects the cold tire pressure 60, as reflected by a sensitivity shown in the graph of FIG. 7, which yields about a one pound per square inch (psi) change in cold pressure 60 for a 10-degree Fahrenheit change in cold temperature 66 of the tire 12. Therefore, the cold pressure data 60 is adjusted to arrive at a compensated or adjusted cold tire pressure 68, as shown in FIG. 8. An exemplary adjustment executed by the temperature compensator 64 includes calculating the compensated or adjusted cold tire pressure 68 as equal to the cold tire pressure 60 multiplied by a ratio of an adjusted tire temperature to the measured tire temperature 66:

$$P_{adjusted} = P_{measured}\left(\frac{T_{adjusted}}{T_{measured}}\right)$$

In this manner, the temperature compensator 64 generates the compensated cold tire pressure 68. It is to be understood that any suitable data compensation technique may be employed by the temperature compensator 64 to generate the compensated cold tire pressure 68.

Figure 9:
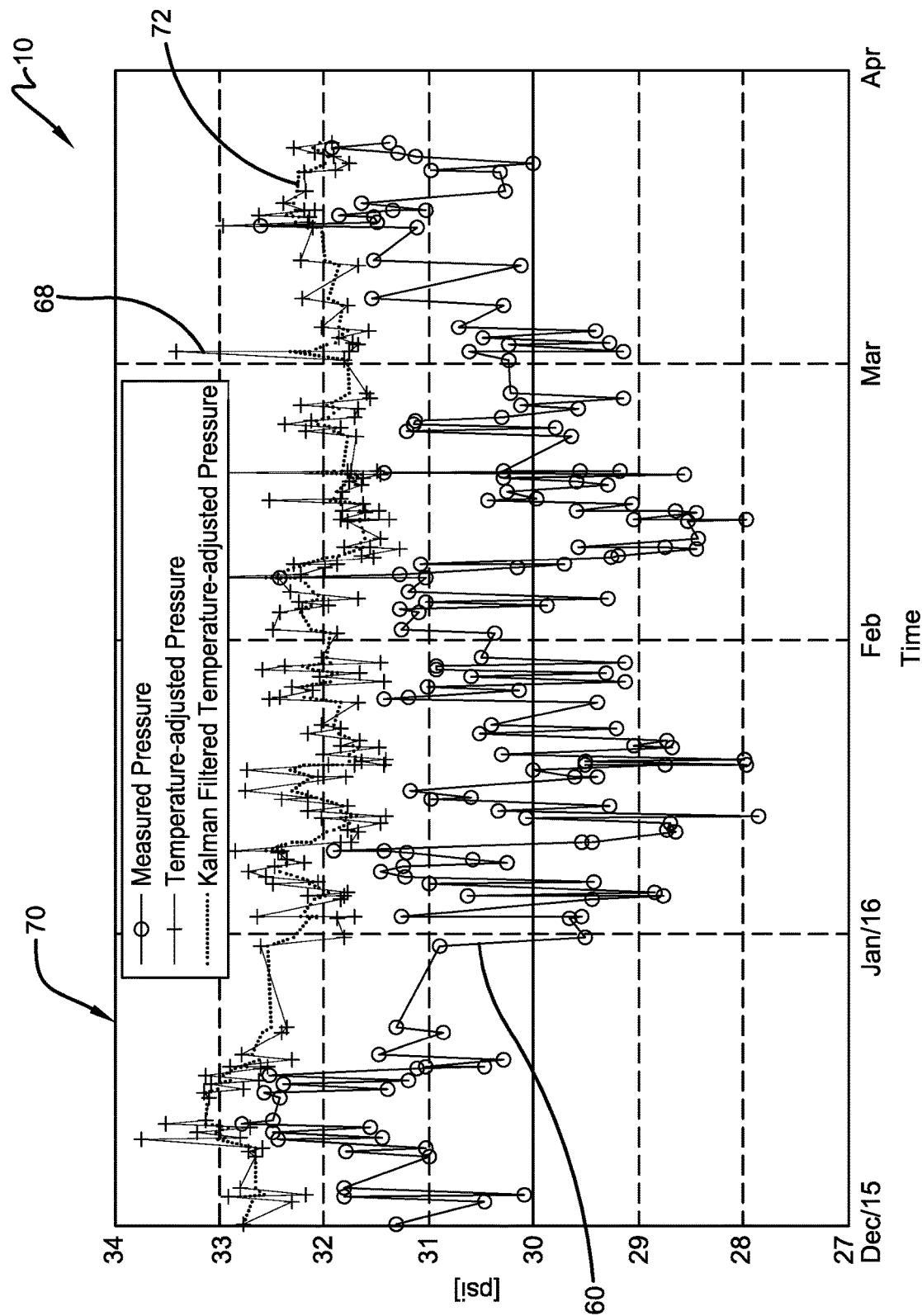
FIG. 9 is a graphical representation of another aspect of the tire pressure monitoring system shown in FIG. 4.

Returning to FIG. 4, the tire pressure model 54 filters sensor noise from the compensated cold tire pressure 68 with a noise filter 70. More particularly, there may be unwanted variations, known as noise, in the data signal transmitted by the TPMS sensor 30. To improve the accuracy of the tire pressure data, and specifically the compensated cold tire pressure data 68, the variations or noise are filtered out of the data using the noise filter 70, which preferably includes a linear quadratic estimation or a Kalman filter. As shown in FIG. 9, the noise filter 70 processes the compensated cold tire pressure data 68 using the Kalman filter and generates a filtered cold tire pressure 72.

Returning again to FIG. 4, the filtered cold tire pressure data 72 may optionally be stored in an electronic storage means 74, such as a data buffer. The storage means 74 enables the filtered cold tire pressure data 72 to be stored for further analysis and/or historical archiving. Once the tire pressure model 54 extracts heat effects from the tire data 56 with the driving event extractor 58, filters ambient temperature effects from the cold pressure data 60 with the temperature compensator 64, and filters sensor noise from the compensated cold tire pressure 68 with the noise filter 70, a detection module 76 analyzes the filtered cold tire pressure 72 for data indicative of inflation or deflation of the tire 12.

Figure 10:
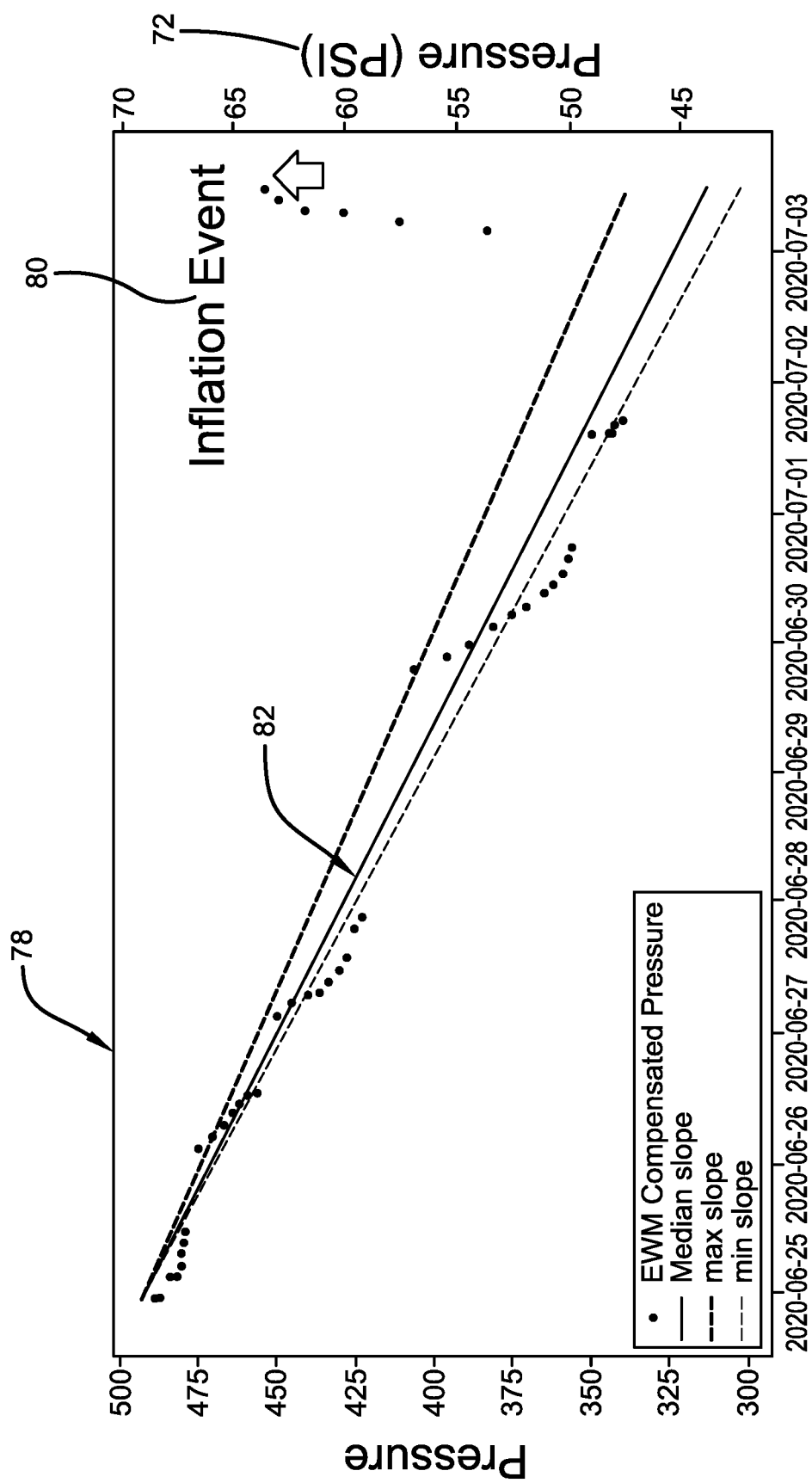
FIG. 10 is a graphical representation of another aspect of the tire pressure monitoring system shown in FIG. 4.

More particularly, the detection module 76 includes a comparator 78, which analyzes the filtered cold tire pressure data 72. As shown in FIG. 10, the comparator 78 detects an inflation 80 of the tire 12 by comparing neighboring filtered cold tire pressure data values 72 to find local maxima. When an inflation 80 is detected, the tire pressure model 54 generates an inflation notification 84, as will be described in greater detail below.

The detection module 76 also determines whether a specific tire 12 has an air leak, and if so, the rate of the leak. More particularly, the detection module 76 converts time scale observations into an absolute scale, and executes a regression analysis to fit the filtered cold tire pressure data 72 with a robust regression. A slope 82 as the median of all slopes between paired values at a 95 percent confidence interval is determined, and equates to the air pressure leak rate of the tire 12.

Figure 11:
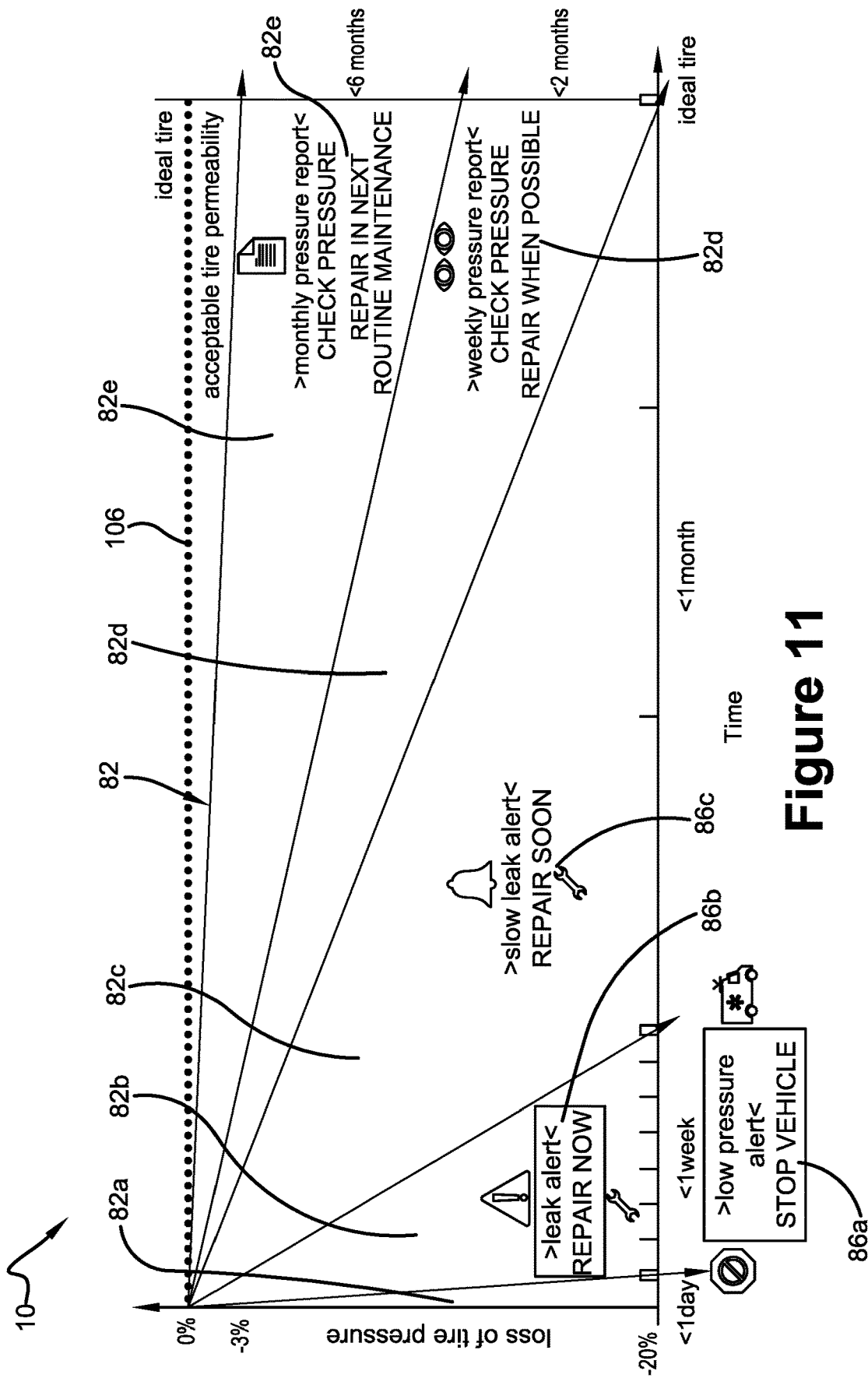
FIG. 11 is a graphical representation of notification types in accordance with the tire pressure monitoring system shown in FIG. 4.

Referring to FIG. 11, the air pressure leak rate 82 below a target air pressure 106 for the tire 12 dictates the type of a leak notification 86 that is generated by the system 10. For example, a first leak rate 82*a* includes an air pressure rate loss of more than 20 percent of the air in the tire 12 within a 24-hour or one day time period. The first leak rate 82*a* is considered to be a rapid leak rate and dictates a first leak notification 86*a*, which is to immediately stop the vehicle 14 for repair or replacement of the tire 12. A second leak rate 82*b* includes an air pressure rate loss of more than 20 percent of the air in the tire 12 during a time period that is between one day and one week. The second leak rate 82*b* dictates a second leak notification 86*b* to repair the tire 12 "now" or within the next day, enabling the vehicle 14 to be directed to a service center in a safe manner during an appropriate time window.

A third leak rate 82*c* includes an air pressure rate loss of more than 20 percent of the air in the tire 12 during a time period that is between one week and one month. The third leak rate 82*c* dictates a third leak notification 86*c* to repair the tire 12 "soon" or within the next week, enabling the vehicle 14 to be directed to a service center in a safe and convenient manner during an appropriate time window. A fourth leak rate 82*d* includes an air pressure rate loss of more than 20 percent of the air in the tire 12 during a time period that is between one month and two months. The fourth leak rate 82*d* dictates a fourth leak notification 86*d* to check and/or repair the tire 12 "when possible" or within the next several weeks, enabling the vehicle 14 to be scheduled for service during an appropriate time window.

A fifth third leak rate 82*e* includes an air pressure rate loss of more than 20 percent of the air in the tire 12 during a time period that is between two months and six months. The fifth leak rate 82*c* dictates a fifth leak notification 86*e* to check and/or repair the tire 12 "in next routine maintenance" or within the next month, enabling the tire to be checked during the next scheduled maintenance of the vehicle 14. The leak rate 82 and corresponding leak notification 86 may be adjusted depending on particular operating conditions for the tire 12 and/or service conditions for the vehicle 14, and thus may be different from the foregoing examples, without affecting the concept or operation of the invention.

Figure 12:
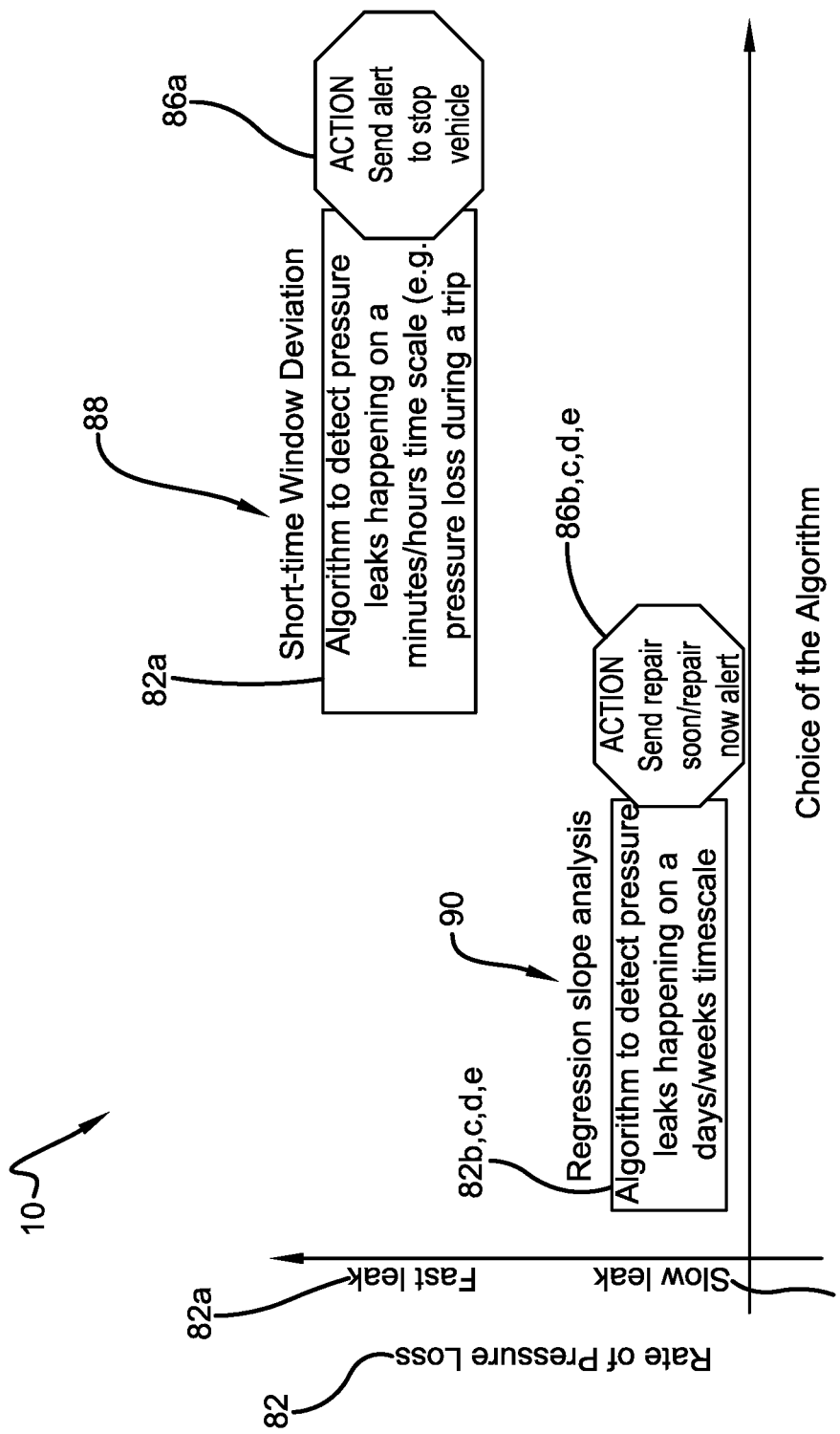
FIG. 12 is a graphical representation of analysis type based on rate of pressure loss in accordance with the tire pressure monitoring system shown in FIG. 4.

Turning to FIG. 12, the air pressure leak rate 82 may also dictate the particular analysis technique to be employed, further increasing the accuracy of the tire pressure monitoring system 10. For example, for a rapid leak rate such as the first leak rate 82a, which may be an air pressure rate loss of more than 20 percent of the air in the tire 12 within a 24-hour time period, a rapid leak model 88 is employed. A preferred rapid leak model 88 is a short-time window deviation model. For a leak rate 82 that may be considered a slow leak, such as the second leak rate 82b, third leak rate 82c, fourth leak rate 82d and fifth leak rate 82e, which may be an air pressure rate loss of more than 20 percent of the air in the tire 12 during a time period that is between one day and several weeks or months, a slow leak model 90 is employed. A preferred slow leak model 90 includes a regression slope analysis technique.

Figure 13:
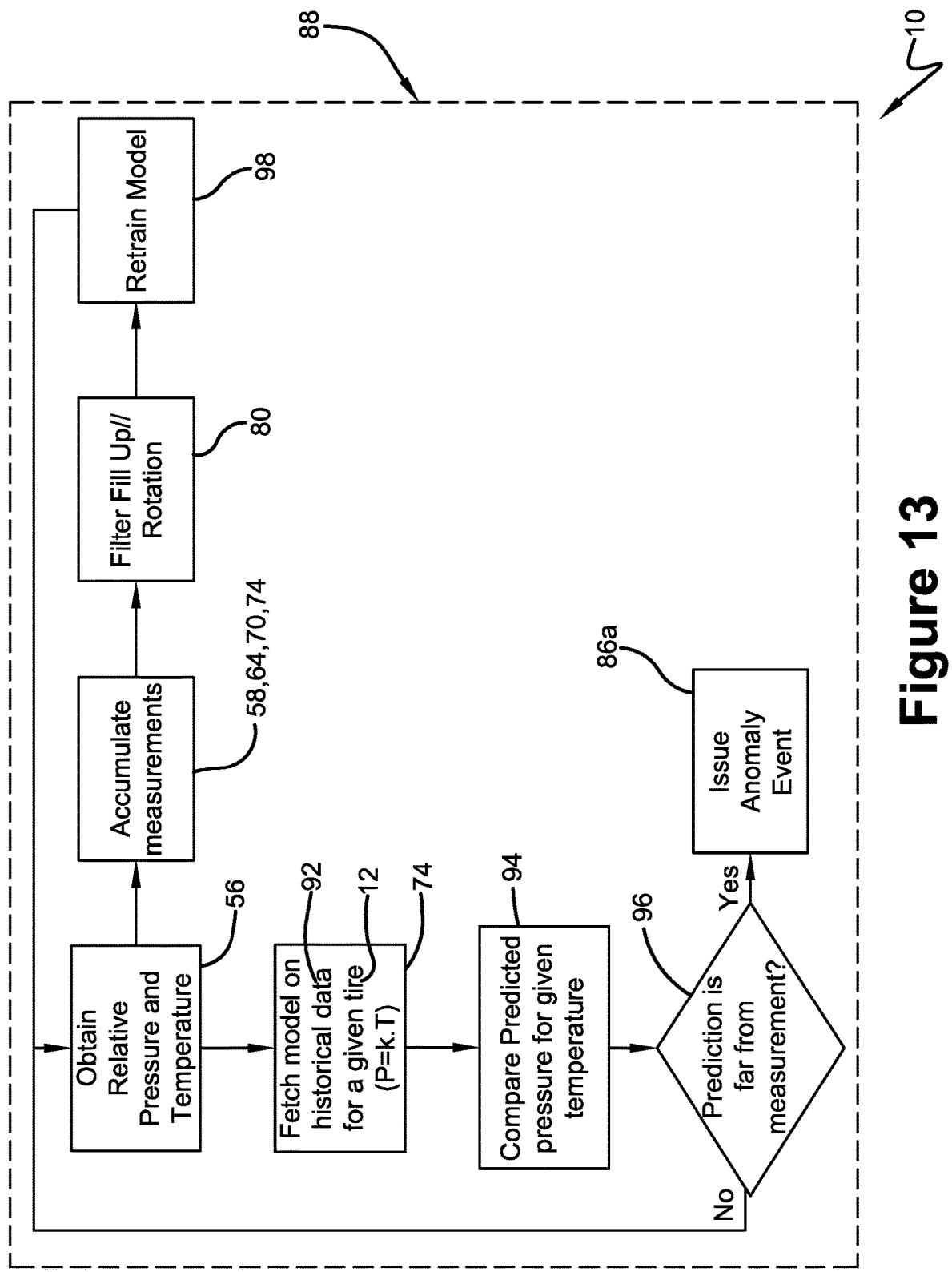
FIG. 13 is a flow diagram of an analysis model based on a rapid rate of pressure loss in accordance with the tire pressure monitoring system shown in FIG. 4.

With reference to FIG. 13, an exemplary rapid leak model 88 is shown. The rapid leak model 88 receives tire data 56. The driving event extractor 58 extracts heat effects from the tire data 56, the temperature compensator 64 filters ambient temperature effects, the noise filter 70 filters sensor noise, and the data buffer 74 stores the resulting filtered cold tire pressure data 72. The comparator 78 detects inflation 80 of the tire 12, and uses this information to continuously retrain the model 98. In addition, historical data 92 is retrieved from the data buffer 74.

According to the ideal gas law, the volume of the tire cavity 28 remains within a relatively small interval during operation of the tire 12, which may be modeled as a constant with a predetermined error. Once enough tire data 56 for the tire 12 has been gathered, the rapid leak model 88 executes a linear regression of the tire pressure data, and compares a set of consecutive tire data to the model output 94. If a difference between the prediction from the linear regression and the tire data 56 is greater than a predetermined threshold amount 96, a rapid leak rate 82a is detected, and the first leak notification 86a to immediately stop the vehicle 14 is generated.

Figure 14:
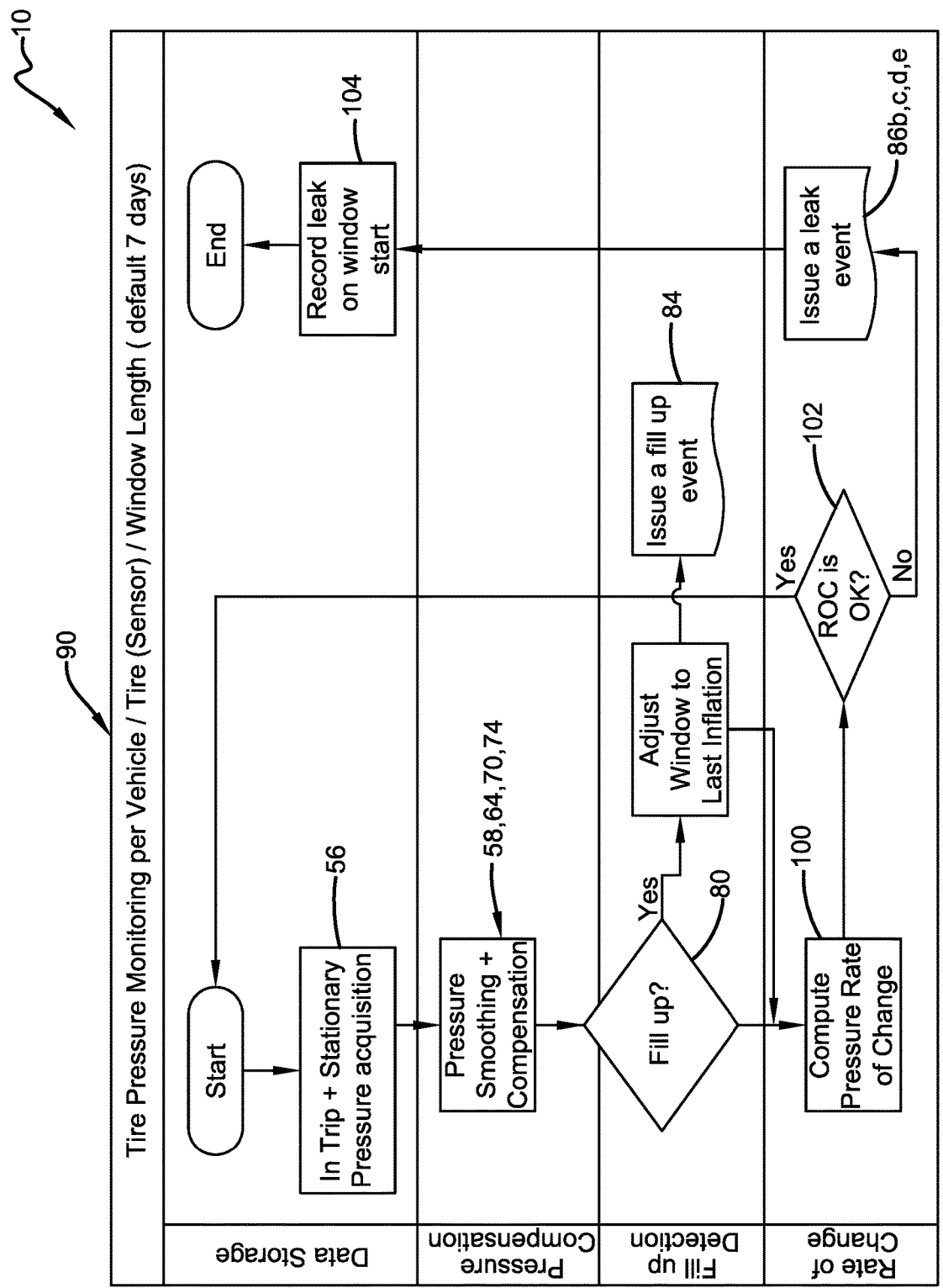
FIG. 14 is a flow diagram of an analysis model based on a slow rate of pressure loss in accordance with the tire pressure monitoring system shown in FIG. 4.

Turning to FIG. 14, an exemplary slow leak model 90 is shown. The slow leak model 90 receives tire data 56. The driving event extractor 58 extracts heat effects from the tire data 56, the temperature compensator 64 filters ambient temperature effects, the noise filter 70 filters sensor noise, and the data buffer 74 stores the resulting filtered cold tire pressure data 72. The comparator 78 detects inflation 80 of the tire 12, and when inflation is detected, the inflation notification 84 is generated. When inflation 80 is not detected, the slow leak model 90 analyzes the filtered cold tire pressure data 72 with a regression slope analysis technique to determine a rate of pressure change 100 in the tire 12. The slow leak model 90 executes a verification 102 of the rate of pressure change 100, and an appropriate slow leak notification 86b, 86c. 86d or 86e for the rate of pressure change is generated.

Returning to FIGS. 3 and 4, the tire pressure model 54 generates an inflation notification 84 when inflation 80 is detected. When an air pressure leak in the tire 12 is detected, the tire pressure model 54 generates an appropriate leak notification 86 that corresponds to the leak rate 82. When a notification 84 or 86 is generated, the tire pressure monitoring system 10 preferably wirelessly transmits 46 the notification from the cloud-based server 44 to the fleet management server 50, which is shown on the display 52. Display of the notifications 84 and 86 enables a fleet manager viewing the display 52 to take preventative measures, such as instructing a vehicle operator to slow the vehicle 14 down, direct the vehicle to a service center, and/or schedule the vehicle for maintenance. The notifications 84 and 86 may also be transmitted to a device that is visible to the operator of the vehicle 14, thereby enabling the operator to take action based on the notification. In addition, as shown in FIGS. 3 and 14, the notifications 84 and 86 may be recorded 104 in the cloud-based server 44 for future analysis.

In this manner, the tire pressure monitoring system 10 obtains tire pressure data 56, extracts heat effects from the tire data, filters ambient temperature effects, filters sensor noise, detects inflation of the tire 12, and detects an air pressure leak in the tire. When the system 10 detects inflation 80 of the tire 12, an inflation notification 84 is generated. When the system 10 detects an air pressure leak in the tire 12, the system determines with precision if a rapid air pressure leak or a slow air pressure leak in each tire 12 is present, and generates a corresponding leak notification 86. By distinguishing between a rapid leak condition 82a and slow leak conditions 82b, 82c, 82d and 82e, the tire pressure monitoring system 10 enables a fleet manager to take appropriate action based upon the condition according to a fleet maintenance schedule, rather than unnecessarily removing the vehicle 14 from immediate service.

The present invention also includes a method of monitoring tire pressure. The method includes steps in accordance with the description that is presented above and shown in FIGS. 1 through 14.

It is to be understood that the structure of the above-described tire pressure monitoring system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire pressure monitoring system for monitoring the pressure in at least one tire supporting a vehicle, the system comprising:
    at least one sensor mounted on the at least one tire for measuring a pressure and a temperature of the at least one tire;
    means for transmitting the measured pressure data and temperature data to a processor; and
    a tire pressure model being executed on the processor, the tire pressure model including:
        a driving event extractor to extract cold pressure data from the measured pressure data;
        a temperature compensator to generate a compensated cold tire pressure from the cold pressure data;
        a noise filter to filter sensor noise and generate a filtered cold tire pressure from the compensated cold tire pressure;
        a detection module receiving the filtered cold tire pressure and determining an air pressure leak rate of the at least one tire; and
        a leak notification corresponding to the air pressure leak rate generated by the tire pressure model, wherein when the air pressure leak rate includes an air pressure rate loss of more than 20 percent of the air in the at least one tire within a 24-hour time period, the leak notification includes a first leak notification to stop the vehicle.

2. The tire pressure monitoring system of claim 1, further comprising an electronic memory capacity in the at least one sensor or in a unit mounted on the at least one tire, the electronic memory capacity for storing tire identification information, and means for transmitting the tire identification information to the processor, wherein the tire pressure model receives the tire identification information.

3. The tire pressure monitoring system of claim 1, wherein the compensated cold tire pressure generated by the temperature compensator is equal to a cold tire pressure multiplied by a ratio of an adjusted tire temperature to a measured tire temperature.

4. The tire pressure monitoring system of claim 1, wherein the noise filter includes a linear quadratic estimation or a Kalman filter.

5. The tire pressure monitoring system of claim 1, wherein the detection module detects an inflation of the at least one tire.

6. The tire pressure monitoring system of claim 5, wherein the inflation of the at least one tire is determined by comparing neighboring filtered cold tire pressure data values to find local maxima.

7. The tire pressure monitoring system of claim 5, further comprising an inflation notification generated by the tire pressure model when the detection module detects inflation of the at least one tire.

8. The tire pressure monitoring system of claim 1, wherein the detection module executes a regression analysis to determine the air pressure leak rate of the at least one tire.

9. The tire pressure monitoring system of claim 1, wherein the detection module executes a rapid leak model when the air pressure leak rate includes an air pressure rate loss of more than 20 percent of the air in the at least one tire within a 24-hour time period.

10. The tire pressure monitoring system of claim 9, wherein the rapid leak model includes a short-time window deviation model.

11. The tire pressure monitoring system of claim 1, wherein the detection module executes a slow leak model when the air pressure leak rate includes an air pressure rate loss of more than 20 percent of the air in the at least one tire during a time period that is between one day and at least multiple weeks.

12. The tire pressure monitoring system of claim 11, wherein the slow leak model includes a regression slope analysis.

13. The tire pressure monitoring system of claim 1, wherein when the air pressure leak rate includes an air pressure rate loss of more than 20 percent of the air in the at least one tire during a time period that is between one day and one week, the leak notification includes a second leak notification.

14. The tire pressure monitoring system of claim 13, wherein when the air pressure leak rate includes an air pressure rate loss of more than 20 percent of the air in the at least one tire during a time period that is between one week and one month, the leak notification includes a third leak notification.

15. The tire pressure monitoring system of claim 14, wherein when the air pressure leak rate includes an air pressure rate loss of more than 20 percent of the air in the at least one tire during a time period that is between one month and two months, the leak notification includes a fourth leak notification.

16. The tire pressure monitoring system of claim 15, wherein when the air pressure leak rate includes an air pressure rate loss of more than 20 percent of the air in the at least one tire during a time period that is between two months and six months, the leak notification includes a fifth leak notification.

17. The tire pressure monitoring system of claim 1, further comprising a data buffer to store filtered cold tire pressure data.

18. The tire pressure monitoring system of claim 1, wherein the processor includes at least one of a vehicle-mounted processor and a remote processor.

19. The tire pressure monitoring system of claim 1, wherein the tire pressure monitoring system transmits the notification to a fleet management server.

* * * * *